(12) United States Patent
Kubo et al.

(10) Patent No.: US 6,662,002 B2
(45) Date of Patent: Dec. 9, 2003

(54) FREQUENCY CONVERSION CIRCUIT AND TRANSMITTER

(75) Inventors: Mitsuo Kubo, Tokyo (JP); Masashi Naito, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 137 days.

(21) Appl. No.: 09/683,393

(22) Filed: Dec. 21, 2001

(65) Prior Publication Data

US 2002/0193083 A1 Dec. 19, 2002

(30) Foreign Application Priority Data

Jun. 12, 2001 (JP) .......................... 2001-177519

(51) Int. Cl.$^7$ ................................. H04B 1/16
(52) U.S. Cl. ...................... 455/323; 455/313; 455/333; 327/113; 327/116
(58) Field of Search ................. 455/323, 118, 455/313, 314–316, 226.1, 67.1, 333, 319, 326, 330, 112, 114, 117, 119, 325; 327/113, 116, 105, 115, 355, 357, 367

(56) References Cited

U.S. PATENT DOCUMENTS

| | | | | |
|---|---|---|---|---|
| 3,641,441 A | * | 2/1972 | Gunn et al. ................. | 455/319 |
| 4,313,223 A | * | 1/1982 | Sakamoto et al. .......... | 455/323 |
| 5,742,189 A | * | 4/1998 | Yoshida et al. ............. | 327/113 |
| 5,789,963 A | * | 8/1998 | Sakusabe .................... | 327/356 |
| 5,825,254 A | * | 10/1998 | Lee ............................. | 331/25 |
| 6,154,641 A | * | 11/2000 | Zhang ........................ | 455/112 |
| 6,263,199 B1 | * | 7/2001 | Wortel et al. ............... | 455/333 |
| 6,282,413 B1 | * | 8/2001 | Baltus ........................ | 455/260 |
| 6,298,227 B1 | * | 10/2001 | Molnar ....................... | 455/323 |
| 6,545,516 B2 | * | 4/2003 | Ylamurto et al. .......... | 327/113 |

FOREIGN PATENT DOCUMENTS

JP    5-67998    3/1993

* cited by examiner

*Primary Examiner*—Pablo N Tran
(74) *Attorney, Agent, or Firm*—Pillsbury Winthrop LLP (57) ABSTRACT

A frequency conversion circuit for changing a frequency of an input signal to obtain an output signal, includes: a sum holding unit holding a sum; an integrating unit updating the sum by changing the sum by a natural number a in one direction at each input of a first predetermined signal based on the input signal; and an output signal generating unit outputting a second predetermined signal as the output signal at each time at which the sum has gone over (b*N+c), where N is an integer, c is a constant integer and b is a natural number equal to or larger than a.

7 Claims, 6 Drawing Sheets

FIG. 6

FREQUENCY CONVERSION CIRCUIT AND TRANSMITTER

CROSS REFERENCE TO RELATED APPLICATIONS

This application claims a priority on a Japanese patent application, 2001-177519 filed on Jun. 12, 2001, the contents of which are incorporated herein by reference.

BACKGROUND OF INVENTION

1. Field of the Invention

The present invention relates to a frequency conversion circuit and a transmitter. More particularly, the present invention relates to a frequency conversion circuit that changes a frequency of an input signal in accordance with a changing ratio set in advance, and a transmitter using such a frequency conversion circuit.

2. Description of the Related Art

A frequency divider that divides a frequency of an input signal input thereto so as to generate an output signal is used in a case where an original oscillator clock is divided in order to obtain a reference clock, for example. In many cases, as such a frequency divider, a frequency dividing circuit is used for dividing the frequency of the original oscillator clock input thereto by an integer other than zero.

The techniques for dividing the original oscillator clock are used, for example, in a circuit that can generate various frequencies by changing the division ratio. In this way, the frequency of the reference clock that is generated from the original oscillator clock can be changed by changing the setting of the circuit and therefore the circuit scale can be reduced as compared with a case where reference clock generating circuits are respectively provided for all the possible frequencies of the reference clock.

Moreover, in a case where a plurality of kinds of reference clocks are required in a device, the original oscillator clock may be divided by a plurality of frequency dividers.

A Japanese Patent Application Laying-Open No. 5-67998 disclosed a transmitting/receiving apparatus as an exemplary application of frequency-dividing techniques. In this known example, the transmitting/receiving apparatus that can set a digital mode and an analog mode therein includes a frequency divider for generating the reference clock. More specifically, in this example, an original oscillator clock generating circuit generates the original oscillator clock having a frequency corresponding to a common multiple of those of all the required reference clocks, thereby enabling the generation of a plurality kinds of the reference clocks required in the transmitting/receiving apparatus. The respective components in the transmitting/receiving apparatus use the reference clocks obtained by dividing the original oscillator clock by corresponding integers other than zero.

In the case of using the frequency divider that divides the input signal by an integer other than zero, however, it is sometimes difficult to generate a plurality of desired frequencies from one original oscillator clock.

In the application disclosed in the Japanese Patent Application Laying-Open No. 5-67998, for example, in some cases, the frequency of the original oscillator clock, that is the least common multiple of those of the reference clocks required, may be too high to realize. These cases may be caused when the number of the required reference clocks is large, or when a combination of the reference clocks required is special.

Moreover, in another case, it may become necessary to add a new reference clock after completing the fabrication of the apparatus. In this case, when the new reference clock cannot be obtained by dividing the original oscillator clock by an integer other than zero, it is difficult to obtain such a new reference clock without modifying the fabricated apparatus.

SUMMARY OF INVENTION

Therefore, it is an object of the present invention to provide a frequency conversion circuit and a transmitter, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, a frequency conversion circuit for changing a frequency of an input signal to obtain an output signal, comprises: a sum holding unit operable to hold a sum; an integrating unit operable to update the sum by changing the sum by a in one direction at each input of a first predetermined signal based on the input signal, where a is a natural number; and an output signal generating unit operable to output a second predetermined signal as the output signal at each time at which the sum has gone over (b*N+c), where N is an integer, c is a constant integer and b is a natural number equal to or larger than a.

The integrating unit may hold the sum to which a is added at each input of the first predetermined signal based on the input signal. In this case, the frequency changing unit further comprises a sum adjusting unit operable to reduce the sum by b*k for every k outputs of the second predetermined signal, where k is a positive integer.

Alternatively, the integrating unit may hold the sum from which a is subtracted at each input of the first predetermined signal based on the input signal. In this case, the frequency conversion circuit further comprises a sum adjusting unit operable to add b*k to the sum for every k outputs of the second predetermined signal, where k is a positive integer.

In the frequency conversion circuit, the integrating unit may update the sum at each of the rising of a pulse signal based on the pulse signal serving as the input signal. Furthermore, in the frequency conversion circuit, the output signal generating unit may output the second predetermined signal in synchronization with the rising of the first predetermined signal.

According to the second aspect of the present invention, a transmitter for use in radio communication, comprises: a reference clock generating circuit operable to change a frequency of an original oscillator clock by means of a frequency conversion circuit included therein to generate a reference clock; and a modulation circuit and a digital-analog converter that use the reference clock output from the reference clock generating circuit. In this transmitter, the frequency conversion circuit includes: a sum holding unit operable to hold a sum; an integrating unit operable to update the sum by changing the sum by a in one direction at each input of a first predetermined signal based on an input signal input to the frequency changing unit, where a is a natural number; and an output signal generating unit operable to output a second predetermined signal at each time at which the sum after being updated has gone over (b*N+c), where N is an integer, c is a constant integer and b is a natural number equal to or larger than a, thereby generating the reference clock.

In the transmitter mentioned above, the modulation unit and the digital-analog converter are synchronized with the reference clock output from the reference clock generating unit.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION

The invention will now be described based on the preferred embodiments, which do not intend to limit the scope of the present invention, but exemplify the invention. All of the features and the combinations thereof described in the embodiment are not necessarily essential to the invention.

Figure 1:
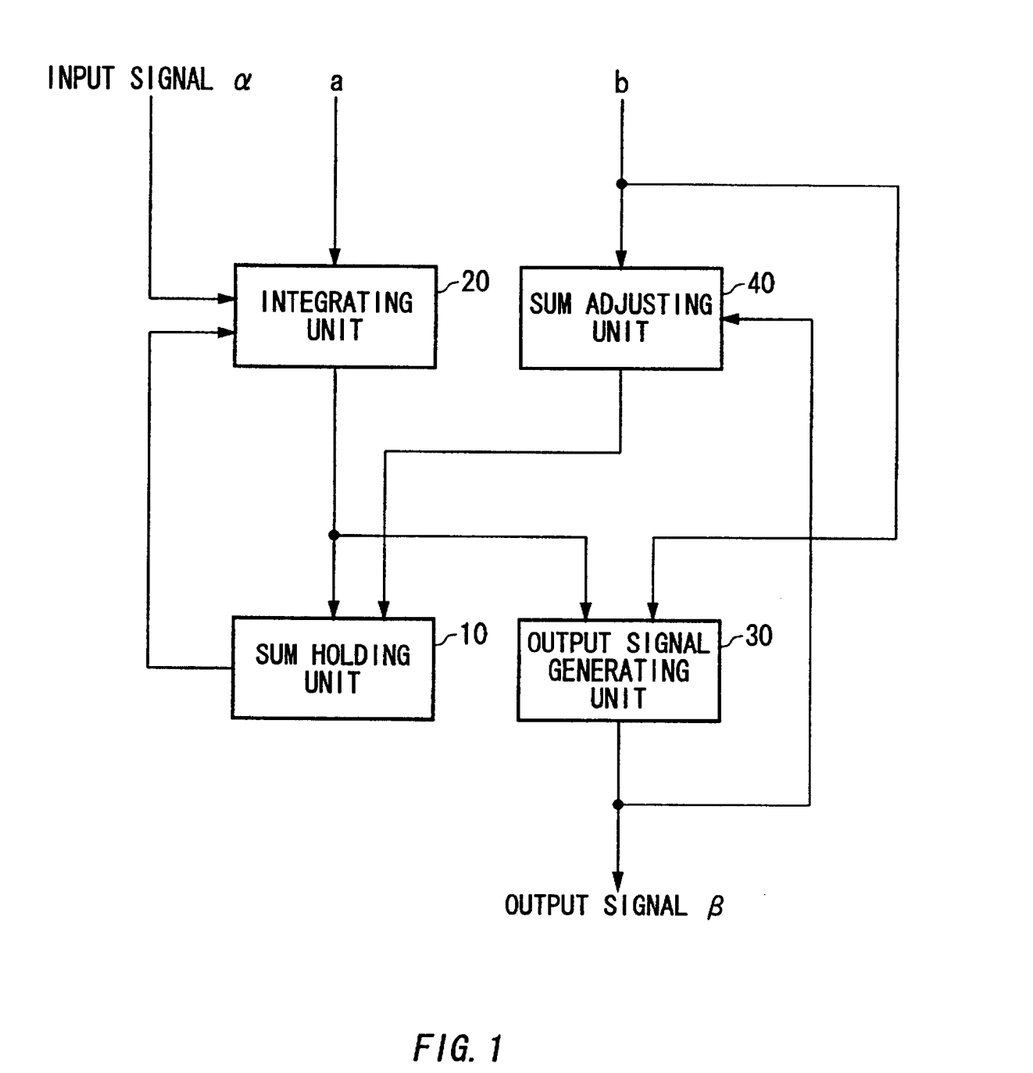
FIG. 1 shows a structure of a frequency conversion circuit according to a first embodiment of the present invention.

(Embodiment 1) FIG. 1 schematically shows a structure of a frequency conversion circuit according to the first embodiment of the present invention.

The frequency conversion circuit of the present embodiment obtains a frequency that equals to a/b times a frequency of an input signal $\alpha$ and outputs a signal having the thus obtained frequency as an output signal $\beta$, where a and bare natural numbers (i.e., 1, 2, . . . ) satisfying a≦b.

The frequency conversion circuit of the present embodiment includes a sum holding unit 10, an integrating unit 20, an output signal generating unit 30 and a sum adjusting unit 40, as shown in FIG. 1. The sum holding unit 10 holds a sum that is used in a frequency-changing operation. The integrating unit 20 adds a to (subtracts a from ) the sum held by the sum holding unit 10 at every rising of the input signal $\alpha$. In other words, the integrating unit 20 updates the sum by changing the sum by a natural number a in one direction at every rising of the input signal $\alpha$. More specifically, when the one direction is an increasing direction, the sum is changed to increase by a at every rising of the input signal. On the other hand, when the one direction is a decreasing direction, the sum is changed to reduce its value by a at every rising of the input signal. The output signal generating unit 30 outputs a pulse as the output signal $\beta$ when the updated sum, that is a value obtained by adding a to the sum held by the sum holding unit 10, goes over a multiple of b. In the present embodiment, the output signal generating unit 30 determines that the updated sum goes over the multiple of b, even when the updated sum is coincident with the multiple of b. The sum adjusting unit 40 prevents overflow of the sum by increasing the sum held by the sum holding unit 20 at each rising of the input signal $\alpha$.

Figure 2:
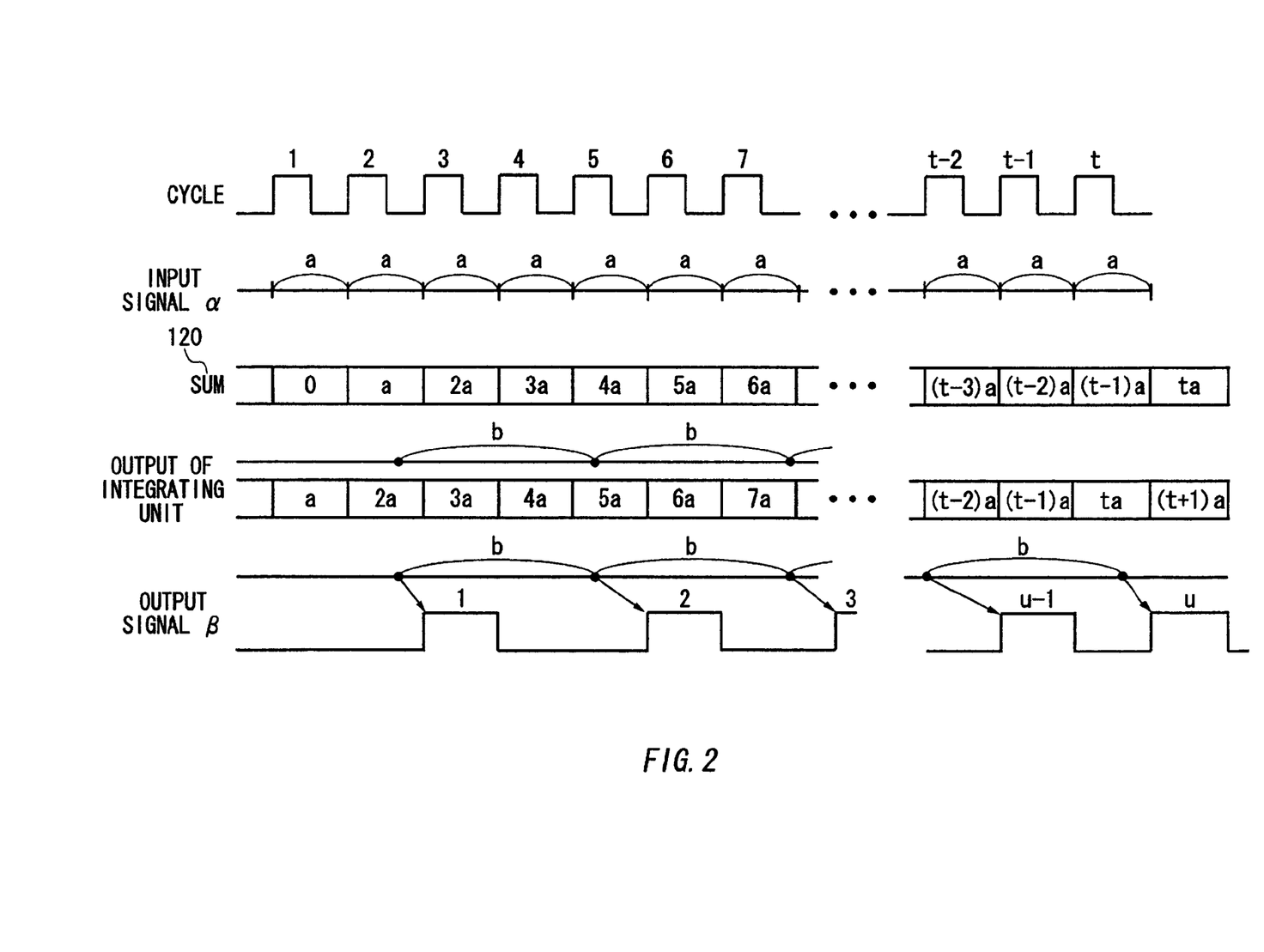
FIG. 2 is a time chart showing an operation principle of the frequency conversion circuit according to the first embodiment of the present invention.

FIG. 2 is a time chart showing an operation principle of the frequency conversion circuit shown in FIG. 1. In the description of the operation principle, the following conditions are considered. Moreover, in order to simplify the description, an operation of the sum adjusting unit 40 is not taken into consideration.

It is assumed that the input signal $\alpha$ is a clock having risings at constant intervals. In FIG. 2, a case is described where the input signal $\alpha$ is input for a time period corresponding to t clocks (i.e., t cycles). Moreover, u represents the number of outputs of the pulse as the output signal $\beta$ when the input signal $\alpha$ is input for the period corresponding to t clocks.

In the following, relationships among t, u, a and b are obtained based on the number u of the outputs of the pulse for the number t of the input clocks of the input signal $\alpha$, thereby showing that the frequency of a/b times the input frequency is obtained by the frequency conversion circuit shown in FIG. 1. The numbers t and u are assumed to be sufficiently large in order to consider an error in calculation of the frequency diving ratio from the number of the input clocks and the number of the pulse outputs to be zero by approximation.

Next, the operation principle of the frequency conversion circuit shown in FIG. 1 is described based on the above conditions. The integrating unit 20 increases the sum 120 by a, every time one clock of the input signal $\alpha$ is input. Thus, when t clocks of the input signal $\alpha$ have been input after a time at which the sum 120 has an initial value zero, the sum 120 is increased by t*a when t cycles have elapsed.

The output signal generating circuit 30 outputs the pulse as the output signal $\beta$ at a time when a value obtained by adding a to the sum 120 goes over a multiple of b. Therefore, the output signal generating unit 30 may be considered to output a single pulse at an interval of b of the sum 120. Thus, when the output signal generating unit 30 has output the pulse u times, the sum 120 may be approximated to be b*u.

From the above, the following approximation is obtained when the t cycles of the input signal $\alpha$ have passed. Note that the symbol "~" in expressions means "nearly equal", hereinafter.

$$t \times a \sim b \times u \qquad (1)$$

Since b is not zero, the following expression is led from Expression (1).

$$u \sim t \times a / b \qquad (2)$$

From Expression (2), it is shown that the frequency conversion circuit of the present embodiment can generate the output signal $\beta$ having the frequency corresponding to a/b times the frequency of the input signal $\alpha$ in a sufficiently long term.

Next, the operation principle of the frequency conversion circuit of the present embodiment in a case of a>b is described. In this case, the sum 120 may go over two or more multiples of b at one time.

Therefore, in the frequency conversion circuit for generating the output signal $\beta$ by changing the frequency of the input signal $\alpha$, that includes the sum holding unit 10 for holding the sum 120, the integrating unit 20 for updating the sum 120 by changing the sum 120 by the natural number a in one direction at every input of a predetermined signal based on the input signal α, and the output signal generating unit 30 for generating another predetermined signal as the output signal β every time the updated sum 120 goes over a multiple of the natural number b, the aforementioned operation principle can be applied to the case of a>b by designing the frequency conversion circuit to output one or more pulses as the output signal β when the sum 120 goes over the multiples of b, the number of the pulses being equal to the number of the multiples of b over which the sum 12 goes.

Figure 3:
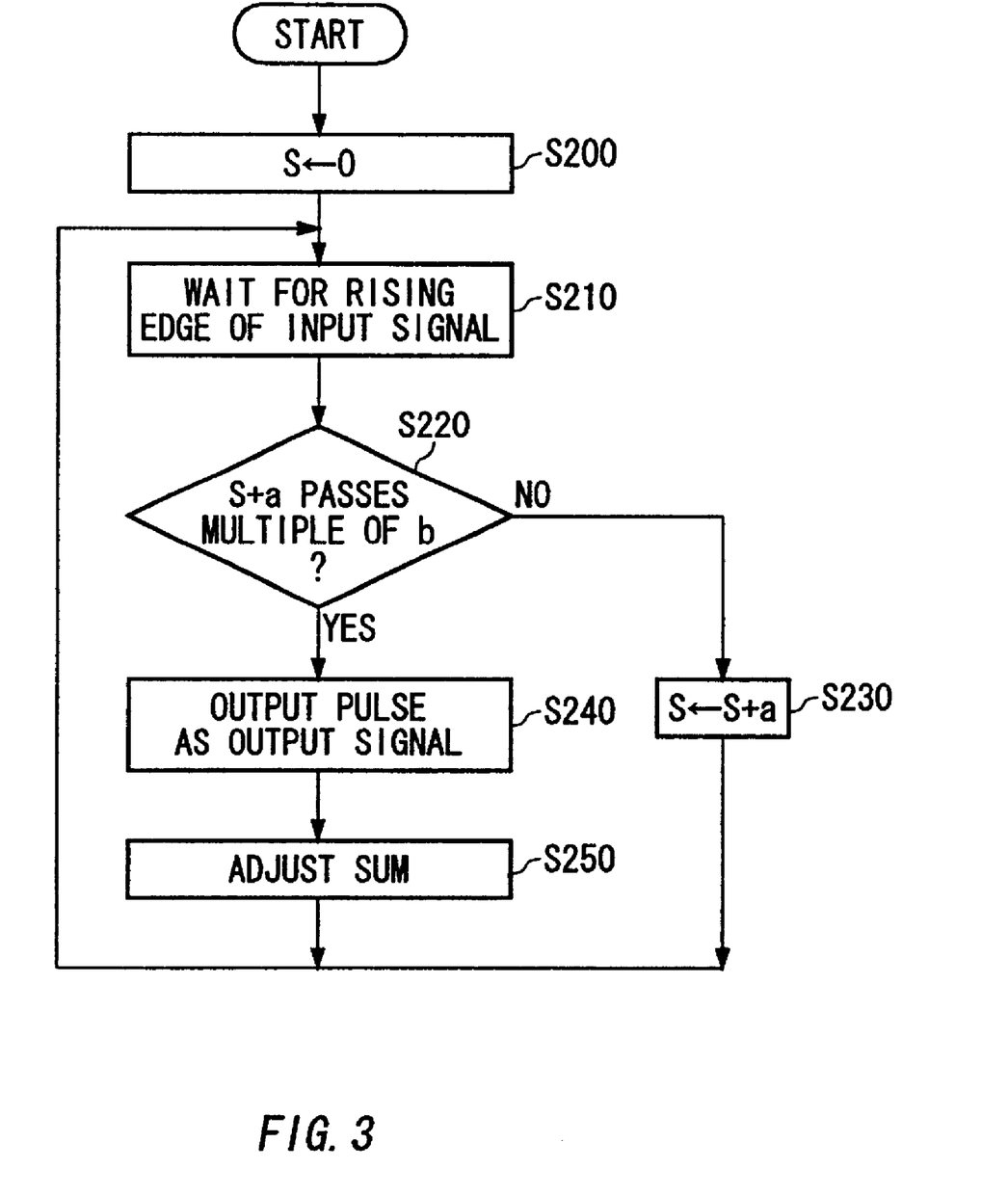
FIG. 3 shows an operation flow of the frequency conversion circuit according to the first embodiment of the present invention.

FIG. 3 shows an operation flow of the frequency conversion circuit for which the operation principle is shown in FIG. 2. The frequency-changing operation is described referring to FIG. 3 below.

Before start of the frequency-changing operation, the sum holding unit 10 initializes the sum S (Step S200). In the present embodiment, the sum holding unit 10 sets the sum S to zero.

Then, the integrating unit 20 detects a rising of the input signal α (Step S210).

The output signal generating unit 30 then determines by using the output of the integrating unit 20 whether or not a value obtained by adding a to the sum S goes over a multiple of b (Step S220).

In a case where the value obtained by adding a to the sum S does not go over any multiple of b, the integrating unit 20 stores the obtained value in the sum holding unit 10 (Step S230). Then, the operation flow goes back to Step S210 and waits for the next rising of the input signal α.

In another case where the value obtained by adding a to the sum S goes over the multiple of b, the output signal generating unit 30 outputs a pulse as the output signal β (Step S240). It should be noted that the output signal generating unit 30 may output one or more pulses, the number of the pulses being the same as the number of the multiples over which the obtained value goes, as described above.

In the present embodiment, since the output signal generating unit 30 determines the sum S at every rising of the input signal α, the output signal generating unit 30 may output the output signal β in synchronization with the rising of the input signal α.

Then, the sum adjusting unit 30 adjusts the sum S by using the pulse output from the output signal generating unit 30 as a trigger of the adjustment (Step S250). The operation flow then goes back to Step S210 and waits for the next rising of the input signal α.

As described above, according to the present embodiment, the frequency conversion circuit that changes the frequency of the input signal α input thereto to generate the output signal β having the frequency corresponding to a/b times the input frequency.

The adjustment of the sum S in Step S250 is performed for the purpose of preventing the overflow in a case where the sum S is realized by means of a register having a limited number of digits. More specifically, the sum adjusting unit 40 reduces the sum S by b*k for every k outputs of the pulse as the output signal β, for example, after adding a to the sum S. Thus, the amount of increase can be made equal to the amount of reduction, thereby realizing the frequency conversion circuit in which the overflow cannot occur.

Figure 4:
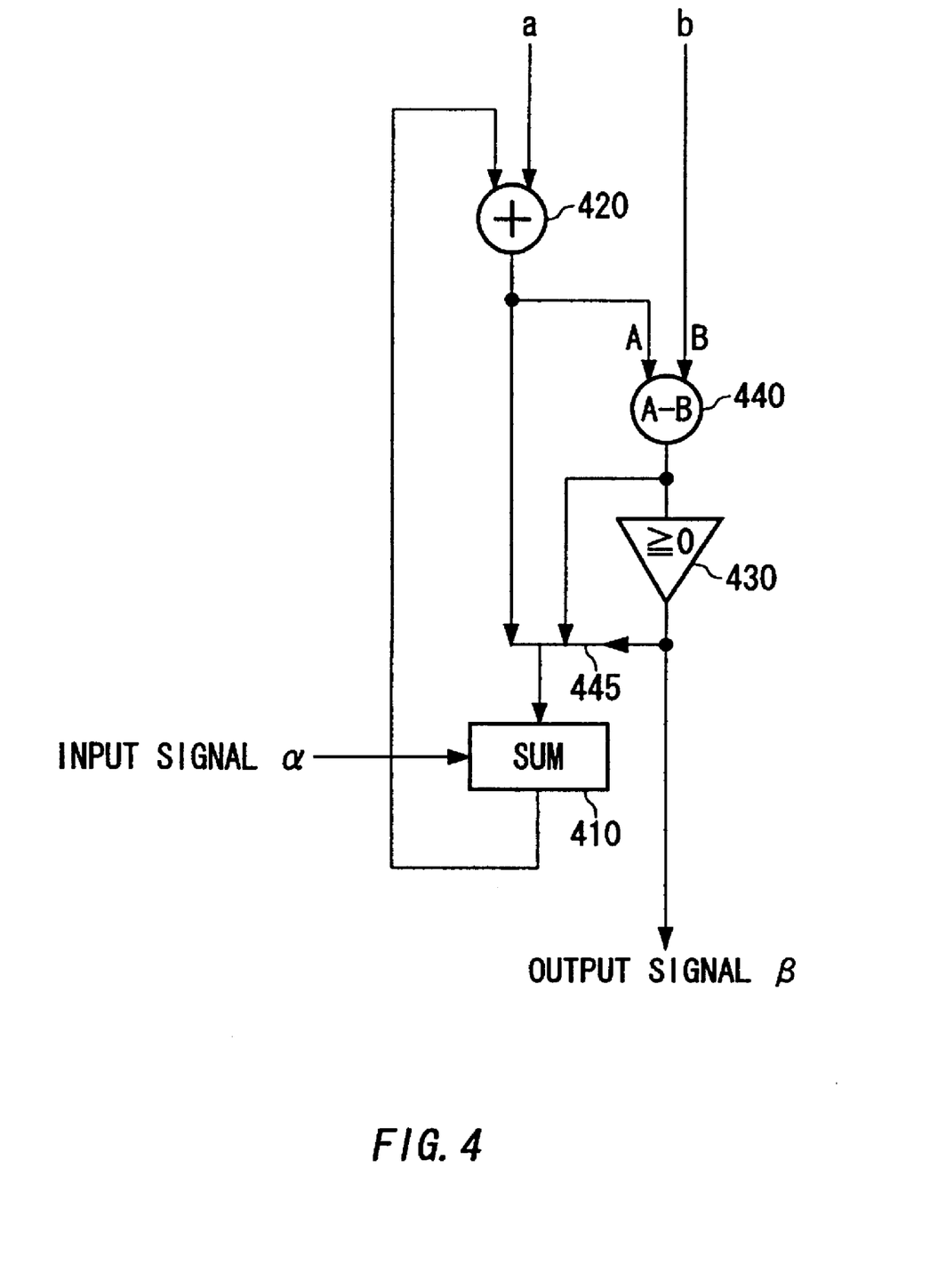
FIG. 4 is a circuit diagram of a frequency conversion circuit according to a second embodiment of the present invention.

(Embodiment 2) FIG. 4 shows a circuit diagram of a frequency conversion circuit according to the second embodiment of the present invention.

The frequency conversion circuit of the present embodiment generates the output signal β having the frequency corresponding to a/b times the frequency of the input signal α. The frequency conversion circuit includes a sum register 410 that corresponds to the sum holding unit 10, an adder 420 corresponding to the integrating unit 20, a comparator corresponding to the output signal generating unit 30, and a subtractor 440 and a selector 445 corresponding to the sum adjusting unit 40, as shown in FIG. 4.

The sum register 410 holds the sum S. Moreover, the sum register 410 updates the sum S to be an output value of either one of the adder 420 or the subtractor 440.

The adder 420 outputs a value obtained by adding a to the value held by the sum register 410.

The comparator 430 outputs "1" by using the output of the subtractor 440 when it is detected that a value of the sum S+a reaches or goes over b. The output "1" is a pulse output of an output clock.

The subtractor 440 outputs, by using the output of the adder 420 and b, (the sum S+a)–b. The comparator 430 uses the value thus output from the subtractor 440 for comparison with zero, thereby determining the pulse output.

The selector 445 supplies the output of the adder 420 to the sum register 410 when the comparator 430 outputs "0", or supplies the output of the subtractor 440 when the comparator 430 outputs "1".

The frequency conversion circuit of the second embodiment is different from that of the first embodiment in the following points. First, the input signal α is input to the sum register 410 corresponding to the sum holding unit 10. Second, the adder 420 corresponding to the integrating unit 20 is connected to the subtractor 440 corresponding to the sum adjusting unit 40. Finally, instead of the integrating unit 20 and b, the subtractor 440 is connected to the comparator 430 corresponding to the output signal generating unit 30.

Therefore, the sum 120 held by the sum register 410 is updated at every rising of the input signal α to be the output of the adder 420 or the subtractor 440.

The selection of the output of the adder 420 corresponding to the integrating unit 20 and the output of the subtractor 440 that is obtained by subtracting b from the output of the adder 420, is performed by the selector 445 corresponding to the sum adjusting unit 40.

The comparator 430 serving as the output signal generating unit 30 determines whether or not a value obtained by adding a to the value held by the sum register goes over a multiple of b, by using the operation result of the subtractor 440 corresponding to the sum adjusting unit 40.

Figure 5:
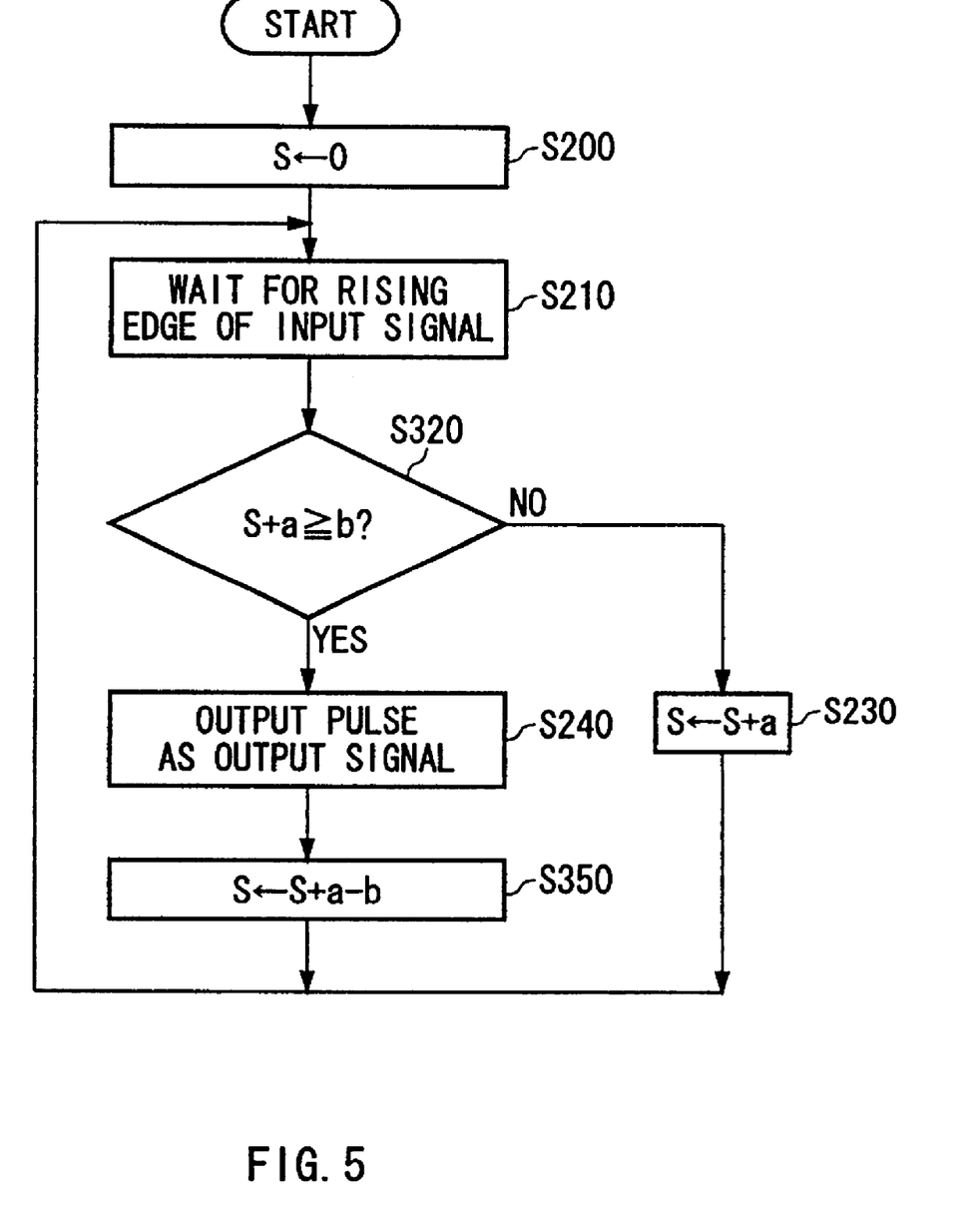
FIG. 5 shows an operation flow of the frequency conversion circuit according to the second embodiment of the present invention.

FIG. 5 shows an operation flow of the frequency conversion circuit shown in FIG. 4. In this operation flow, the adjustment of the sum S in Step S250 in FIG. 3 is replaced with Step S350 where subtraction from the sum 120 by bat every output of the pulse as the output signal β.

In FIG. 5, in accordance with the above replacement of the step, Step S220 in FIG. 3 is replaced with Step S320. This is because the determination whether or not the value obtained by adding a to the sum S goes over the multiple of b in Step S220 in the operation flow shown in FIG. 3 can be done by determination whether or not the sum reaches or exceeds b in Step S320 in the operation flow shown in FIG. 5. In the operation flow of the present embodiment, b is subtracted from the sum 120 at every pulse output as the output signal β. Thus, the sum S is equal to or larger than zero but less then b. Therefore, the fact that the sum S goes over the multiple of b means that the sum S goes over b.

Accordingly, the frequency conversion circuit can be more suitably realized by designing the sum adjusting unit 40 in such a manner that b is subtracted from the sum S at every pulse output as the output signal β.

Next, the frequency changing operation is described referring to FIG. 5.

Prior to the start of the frequency changing operation, the sum register 410 initializes the sum S (Step S200). In the present embodiment, the sum register 410 sets the sum S to zero.

Then, the sum register 420 detects the rising of the input signal α and updates the sum S to be a value output from the selector 445 (Step S210).

When the sum S has been updated, the sum register 420 outputs the updated sum S to the adder 420. The adder 420 adds a with the sum S, and output the added sum to the comparator though the subtractor 440. The comparator 430 determines whether or not (the sum S+a) goes over the multiple of b (Step S320).

In a case where (the sum S+a ) does not go over the multiple of b in Step S320, the comparator 430 outputs zero. Thus, there is no pulse output. The selector 445 receives the zero-output from the comparator 430 and inputs the output of the adder 420 to the sum register 410. Then, the operation flow goes back to Step S210.

In a case where (the sum S+a) goes over the multiple of b, the comparator 430 outputs "1" to cause the pulse output (Step S240). The selector 445 also receives the "1" output from the comparator 430 and inputs the output of the subtractor 440 to the sum register 410 (Step S350). The operation flow then goes back to Step S210.

The frequency conversion circuit of the present embodiment as described above can provide a/b times frequency of the input signal based on the operation principle shown in FIG. 2. Please note that a and b are natural numbers satisfying a≦b.

The frequency conversion circuit of the present embodiment can be used as a reference clock generating circuit that can change the frequency of the original oscillator clock to generate a plurality kinds of reference clocks. If the effective number of digits indicating a and b is increased, a desired reference clock having a required frequency equal to or less than the frequency of the original oscillator clock.

Figure 6:
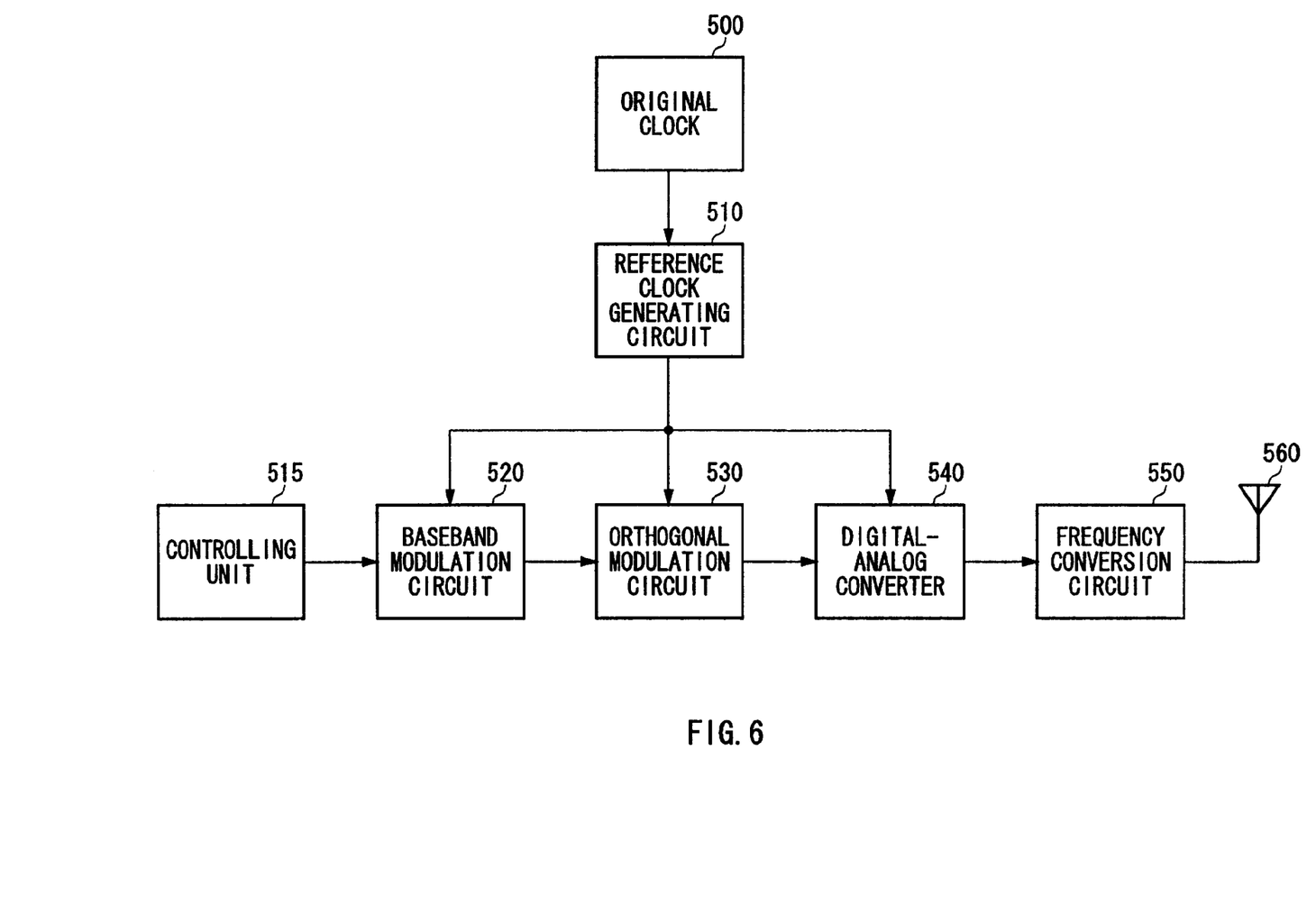
FIG. 6 shows a transmitter according to a third embodiment of the present invention.

(Embodiment 3) FIG. 6 shows a transmitter according to the third embodiment of the present invention.

The transmitter of the present embodiment includes an original oscillator clock 500, a reference clock generating circuit 510, a controlling unit 515, a baseband modulation circuit 520, an orthogonal modulation circuit 530, a digital-analog converter 540, a frequency conversion circuit 550 and an antenna 560.

The transmitter of the present embodiment can deal with a plurality of bit rates, and uses the frequency conversion circuit of any of the first and second embodiments as the reference clock generating circuit 510. The reference clock generating circuit 510 changes the frequency of the original oscillator clock 500 so as to generate reference clocks corresponding to all the required bit rates.

The controlling unit 515 controls the entire transmitter and outputs data. The baseband modulation circuit 520 inputs data, performs signal modulation for the input data in accordance with a determined modulation manner, and outputs I- and Q-phase signals.

The orthogonal modulation circuit 530 performs bandwidth limiting for the output of the baseband modulation circuit 520. The orthogonal modulation circuit 530 then performs up-sampling until a predetermined frequency, performs orthogonal modulation and outputs a digital orthogonal modulation signal.

The digital-analog converter 540 performs digital-analog conversion for the digital orthogonal modulation signal output from the orthogonal modulation circuit 530 so as to output an analog orthogonal modulation signal.

The frequency conversion circuit 550 performs the frequency-changing operation for the analog orthogonal modulation signal from the digital-analog converter 540 and then amplifies the resultant signal. The antenna 560 transmits the signal output from the frequency conversion circuit 550.

The baseband modulation circuit 520, the orthogonal modulation circuit 530 and the digital-analog converter 540 perform the respective operations in synchronization with the reference clock output from the reference clock generating circuit 510.

The transmitter of the present invention can deal with a plurality of bit rates by using a single original oscillator clock. Moreover, even if the transmitter requires a new bit rate, the transmitter of the present embodiment can deal with the new bit rate only by changing the setting of the frequency conversion circuit.

Especially, the setting precision of the frequency diving ratio can be improved by increasing the effective number of digits for representing the values a and b, which are used for determining the frequency diving ratio in the reference clock generating circuit.

The connections between the sum holding unit 10, the integrating unit 20, the output signal generating unit 30, and the sum adjusting unit 40 in the frequency conversion circuit are not limited to those shown in FIG. 1. Other various connections may be considered depending on the operations of the respective components.

For example, the output signal generating unit 30 determines the pulse output based on the output of the integrating unit 20 in the first embodiment. The output signal generating unit 30, however, may perform that determination based on the sum 120 held by the sum holding unit 10.

Moreover, various connections other than those shown in FIG. 1 can be realized as in the arrangement shown in FIG. 4. The scope of the present invention cannot be limited by the manner of the connections of the respective components in the frequency conversion circuit.

In addition, the output signal generating unit 30 may output the pulse as the output signal β every time the sum 120 goes over b*N+c (N is an arbitrary integer and c is a constant integer). Alternatively, the output signal generating unit 30 may output the pulse immediately before the sum 120 goes over the multiple of b or after a certain time period has passed after the sum 120 goes over the multiple of b.

Moreover, the sum holding unit 10 may reduce the sum 120 by a at each input of one clock of the input signal α.

Furthermore, the input signal α may be a normal signal having risings at irregular intervals.

Please note that the frequency conversion circuit of the present invention can achieve the same effects described above, regardless of the form of the input signal α. More specifically, the frequency conversion circuit may update the sum 120 for every input of high or low level, instead of the rising of the input signal α.

Moreover, the frequency conversion circuit of the present invention can achieve the same effects described above, regardless of the form of the output signal β. More specifically, the output signal generating unit 30 may output a high-level or a low-level signal as the output signal β, instead of the pulse signal.

The operation of the sum adjusting unit 40 can be realized in various ways, as long as the amount of the increase of the sum 120 is made equal to the amount of the reduction thereof. For example, the sum adjusting unit 40 may have function of reducing the sum S by b*k for every k pulse outputs as the output signal β, where k can be changed in the every adjustment.

The sum adjusting unit 40 may subtracts a multiple of b from the sum 120 so as to adjust the sum 120, when the overflow of the sum 120 occurs. Moreover, in a case where the sum 120 is reduced by a at each input of a predetermined signal as the input signal α, the multiple of b may be added to the sum 120 when the sum 120 reaches the minimum value.

As is apparent from the above, according to the present invention, the frequency conversion circuit for changing the frequency of the input signal so as to generate the output signal having the frequency corresponding to a/b times the frequency of the input signal. Moreover, by using the frequency conversion circuit of the present invention, the transmitter that can deal with a plurality of bit rates can be realized.

Although the present invention has been described by way of exemplary embodiments, it should be understood that those skilled in the art might make many changes and substitutions without departing from the spirit and the scope of the present invention which is defined only by the appended claims.

What is claimed is:

1. A frequency conversion circuit for changing a frequency of an input signal to obtain an output signal, comprising:

a sum holding unit holding a sum;

an integrating unit updating the sum by changing the sum by a in one direction at each input of a first predetermined signal based on the input signal, where a is a natural number; and an output signal generating unit outputting a second predetermined signal as the output signal at each time at which the sum has gone over (b*N+c), where N is an integer, c is a constant integer and b is a natural number equal to or larger than a.

2. The frequency conversion circuit as claimed in claim 1, further comprising a sum adjusting unit reducing the sum by b*k for every k outputs of the second predetermined signal, where k is a positive integer, wherein said integrating unit holds the sum to which a is added at each input of the first predetermined signal based on the input signal.

3. The frequency conversion circuit as claimed in claim 1, further comprising a sum adjusting unit adding b*k to the sum for every k outputs of the second predetermined signal, where k is a positive integer, wherein said integrating unit holds the sum from which a is subtracted at each input of the first predetermined signal based on the input signal.

4. The frequency conversion circuit as claimed in claim 1, wherein said integrating unit updates the sum at each of the rising of a pulse signal based on the pulse signal serving as the input signal.

5. The frequency conversion circuit as claimed in claim 4, wherein said output signal generating unit outputs the second predetermined signal in synchronization with the rising of the first predetermined signal.

6. A transmitter for use in radio communication, comprising:

an original oscillator clock unit generating an original oscillator clock;

a reference clock generating unit generating a reference clock by changing a frequency of the original oscillator clock the reference clock generating unit including, a sum holding unit holding a sum;

an integrating unit updating the sum by changing the sum by a in one direction at each input of a first predetermined signal based on an input signal input to said reference clock generating unit, where a is a natural number; and an output signal generating unit outputting a second predetermined signal at each time at which the sum after being updated has gone over (b*N+c), where N is an integer, c is a constant integer and b is a natural number equal to or larger than a, for generating the reference clock;

a modulation unit using the reference clock output from said reference clock generating unit; and a digital-analog converter using the reference clock output from said reference clock generating unit.

7. The transmitter as claimed in claim 6, wherein said modulation unit and said digital-analog converter are synchronized with the reference clock output from said reference clock generating unit.

* * * * *